(12) United States Patent
Chen et al.

(10) Patent No.: US 9,556,354 B2
(45) Date of Patent: Jan. 31, 2017

(54) METHOD FOR FABRICATING A SEMICRYSTALLINE POLYMER / GRAPHENE OXIDE COMPOSITE FILM

(71) Applicant: CHUNG-YUAN CHRISTIAN UNIVERSITY, Tao-Yuan (TW)

(72) Inventors: Jung-Tsai Chen, Taoyuan County (TW); Chien-Chieh Hu, Taoyuan County (TW); Kueir-Rarn Lee, Taoyuan County (TW); Juin-Yih Lai, Taoyuan County (TW)

(73) Assignee: CHUNG-YUAN CHRISTIAN UNIVERSITY, Taoyuan (TW)

( * ) Notice: Subject to any disclaimer, the term of this patent is extended or adjusted under 35 U.S.C. 154(b) by 0 days.

(21) Appl. No.: 14/954,875

(22) Filed: Nov. 30, 2015

(65) Prior Publication Data
US 2016/0090500 A1 Mar. 31, 2016

Related U.S. Application Data

(62) Division of application No. 14/077,525, filed on Nov. 12, 2013.

(30) Foreign Application Priority Data

Oct. 25, 2013 (TW) .............................. 102138772 A

(51) Int. Cl.
| | | |
|---|---|---|
| C09D 129/04 | (2006.01) |
| C08L 29/04 | (2006.01) |
| B05D 1/28 | (2006.01) |
| C08K 5/1515 | (2006.01) |
| C08J 7/04 | (2006.01) |

(52) U.S. Cl.
CPC .............. C09D 129/04 (2013.01); B05D 1/28 (2013.01); C08J 7/047 (2013.01); C08K 5/1515 (2013.01); C08L 29/04 (2013.01); C08J 2367/02 (2013.01); C08J 2429/04 (2013.01); C08L 2201/10 (2013.01); C08L 2201/14 (2013.01); C08L 2205/025 (2013.01)

(58) Field of Classification Search
CPC ......... B05D 1/28; B05D 3/0254; C08L 29/04; C08L 2201/10; C08L 2201/14; C08L 2205/025; C01B 31/0438; C01B 2204/00; Y10T 428/30
(Continued)

(56) References Cited

U.S. PATENT DOCUMENTS 3,853,447 A * 12/1974 Steinberg ................ B29C 43/24
425/223

OTHER PUBLICATIONS

Lee et al. ("Transparent and high gas barrier films based on poly(vinyl alcohol)/graphene oxide composites" Thin Solid Films 2011, 519, 7766-7771).*
Jiang et al. ("Preparation and Characterization of Graphene Oxide/ Poly(vinyl alcohol) Composite Nanofibers via Electrospinning" J. Appl. Polym. Sci. 2013, pp. 3026-3032 (published May 18, 2012)).*
Shi et al. ("Strong and ductile poly(vinyl alcohol)/graphene oxide composite films with a layered structure" Carbon 2009, 47, 3538-3543).*

(Continued)

Primary Examiner — Maria Veronica Ewald
Assistant Examiner — Travis Figg
(74) Attorney, Agent, or Firm — WPAT, PC; Justin King

(57) ABSTRACT

The present invention discloses a semicrystalline polymer/ graphene oxide composite film, comprising: a first semicrystalline-typed polymer, distributed in structural space of the composite film and having a porous structure; and graphene oxide, having a layered structure and distributed in the composite film wherein gas passage exist between adjacent layered structures, the first semicrystalline-typed polymer existing between part of adjacent layered structures forms into a second semicrystalline-typed polymer by further heat treatment after the first semicrystalline-typed polymer and graphene oxide are blended uniformly to be distributed in the composite film so as to fill and seal a portion of the porous structure to block gas from flowing to extend path length(s) of gas passage; wherein graphene oxide existing between the first semicrystalline-typed polymers induces formation of the second semicrystalline-typed polymer.

17 Claims, 7 Drawing Sheets

(58) Field of Classification Search
USPC .............. 428/408; 423/447.1, 447.2, 448
See application file for complete search history.

(56) References Cited

OTHER PUBLICATIONS

Goto et al. ("Poly(vinyl alcohol)/graphene oxide nanocomposites prepared by a simple eco-process" Polymer Journal 2012, 44, pp. 1056-1063.*

Duncan ("Applications of nanotechnology in food packaging and food safety: Barrier materials, antimicrobials and sensors" J. Colloid Interface Sci., 2011).

Shi et al. (Strong and ductile poly(vinyl alcohol)/graphene oxide composite films with a layered structure Carbon 2009, 47, 3538-3543).

Jiang et al. ("Preparation and Characterization of Graphene Oxide/Poly(vinyl alcohol) Composite Nanofibers via Electrospinning" J Appl. Polym. Sci. 2013 (Published May 18, 2012).

* cited by examiner

METHOD FOR FABRICATING A SEMICRYSTALLINE POLYMER / GRAPHENE OXIDE COMPOSITE FILM

CROSS REFERENCE TO RELATED APPLICATIONS

This is a divisional of U.S. Ser. No. 14/077,525, filed Nov. 12, 2013 by the same inventors, and claims priority there from. This divisional application contains rewritten claims to the restricted-out subject matter of original claims.

BACKGROUND OF THE INVENTION

1. Field of the Invention

The present invention is generally related to a composite film and method thereof, and more particularly to a semicrystalline polymer/graphene oxide composite film and method thereof.

2. Description of the Prior Art

Accompanying with the advance of technologies, new mobile or portable information electronic products keep continuously emerging and a flat panel display thereon has to be applicable to the flexible display technology and flexible electronic devices in addition to being light, thin, compact, etc.

A barrier film is a barrier layer to block gas and moisture from flowing so as to keep gas and moisture on one side of the film. Therefore, such a barrier film can be applied in food wrapping, packaging, solar cells, flexible displays, etc. and plays an important role in electronic and packaging industries. Since organic and metallic substances usually used in electronic industries are sensitive to oxygen and moisture, passage of moisture and oxygen may cause metal in electronic components to oxidize so as to affect performance of a display and shorten lifetime of a display. Therefore, an electronic product should be properly packaged for suitable protection.

A flexible display becomes the current trend for a new era of display research where the substrate for a flexible display is a flexible plastic substrate instead of glass. However, there are many manufacturing problems to be conquered in order to provide a usable reliable flexible plastic substrate. Among these, a flexible plastic substrate having high transparency and high size stability is urgently needed. The size stability and limitation of operational temperature of a flexible plastic substrate is a big limiting factor. On the other hand, gas barrier processing for a flexible plastic substrate is one other key factor to determine the lifetime of a flexible display and to maintain display quality.

Besides, it is reported that polyvinyl alcohol being a water soluble polymer to be high hydrophilic, biocompatible, nontoxic, and capable of film forming (H. M. Kim, J. K. Lee, H. S. Lee, Transparent and high gas barrier films based on poly(vinyl alcohol)/graphene oxide composites, Thin Solid Films, In Press, Corrected Proof.). A polyvinyl alcohol film has the characteristics of high transparency (transmittance >90%) and being a good gas barrier. In addition, it is a dense film with high crystallinity and has good adhesiveness, oil and solvent resistance. Regarding its mechanical properties, a polyvinyl alcohol film has good toughness and large tensile strength (44.1~63.7) to have good tear resistance among various plastic films so as to be extensively used in food packaging. However, the polyvinyl alcohol film fulfills the requirements as a gas barrier for food packaging but requires further improvement for electronic industries, such as functioning as a substrate of a flexible display.

Furthermore, oxygen transport and free volume in cold-crystallized and melt-crystallized poly(ethylene naphthalate) (PEN) is reported by Y. S. Hu, R. Y. F. Liu, L. Q. Zhang, M. Rogunova, etc. (*Macromolecules* 2002, 35, 7326-7337) where crystallization enhances gas barrier property of PEN even for small gas molecules. A Study of the Gas Barrier Properties of Highly Oriented Polyethylene is reported by P. S. HOLDEN, G. A. J. ORCHARD, I. M. WARD, etc. (Journal of Polymer Science: Polymer Physics Edition, Vol. 23,709-731 (1985)) where crystallization enhances gas barrier property of polyethylene film even for small gas molecules.

A graphene-made film has high gas barrier property as well but it lacks transparency and flexibility when its film thickness becomes thicker. Therefore, a graphene film cannot be standalone as a gas barrier and may be suitable to combine with other polymers such as polyvinyl alcohol to be used as a composite material to maintain gas barrier property together with transparency.

On the other hand, a gas barrier film with high transparency formed by blendng polyvinyl alcohol water soluble polymer with clay is reported but the gas barrier film becomes brittle to be unsuitable in flexible applications because there are a lot of clay needed to have the gas blockage effect. Besides, a composite film formed by mixing polymer with layered graphene oxide is not reported.

Therefore, it is urgently needed to have a good gas barrier film with high transparency suitable to be coated on a substrate for a flexible display.

SUMMARY OF THE INVENTION

In light of the above background, in order to fulfill the requirements of industries, one object of the present invention is to provide a semicrystalline polymer/graphene oxide composite film and method thereof, to effectively form a good gas barrier film with high transparency.

Another object of the present invention is to provide a semicrystalline polymer/graphene oxide composite film formed by blending graphene oxide with a polymeric solution and using solution casting and dry phase inversion methods so as to extend the length of gas passage to enhance the gas barrier performance.

One other object of the present invention is to provide a semicrystalline polymer/graphene oxide composite film to achieve the purpose of enhancing gas barrier effect by adding an optimum amount of graphene oxide and utilizing the crystalline characteristic of a polymer to block gas from flowing through or prolong the length of gas passage from one side of the film to the other side by processing the semicrystalline polymer with heat to cause recrystallization of polymeric molecule among gaps of the layered graphene oxide molecules.

Accordingly, the present invention discloses a semicrystalline polymer/graphene oxide composite film, comprising: a first semicrystalline-typed polymer, distributed in structural space of the composite film and having a porous structure; and graphene oxide, having a layered structure and distributed in the composite film wherein gas passage exist between adjacent layered structures, the first semicrystalline-typed polymer existing between part of adjacent layered structures forms into a second semicrystalline-typed polymer by further heat treatment after the first semicrystalline-typed polymer and graphene oxide are blended uniformly to be distributed in the composite film so as to fill and seal a portion of the porous structure to block gas from flowing to extend path length(s) of gas passage; wherein graphene oxide existing between the first semicrystalline-typed polymers induces formation of the second semicrystalline-typed polymer. The polymer is selected from the group consisting of the following or combination thereof: polyvinyl alcohol (PVA), ethylene-vinyl alcohol (EVOH) copolymer, polyethylene terephthalate (PET), polypropylene (PP), olyvinylidene chloride, polyetheretherketon (PEEK), and ethylene vinyl acetate copolymer.

In one embodiment, the polymer is polyvinyl alcohol and the semicrystalline polymer/graphene oxide composite film is semicrystalline polyvinyl alcohol/graphene oxide composite film having a film thickness of 5~100 μm. Preferably, the semicrystalline polymer/graphene oxide composite film is semicrystalline polyvinyl alcohol/graphene oxide composite film having a film thickness of 10 μm. The semicrystalline polymer/graphene oxide composite film is a semicrystalline polyvinyl alcohol/graphene oxide composite film and a weight ratio of semicrystalline-typed polyvinyl alcohol to graphene oxide of the composite film is 1000:1~50:1. Preferably, the weight ratio of semicrystalline polyvinyl alcohol to graphene oxide of the composite film is 1000:1.

Accordingly, the present invention discloses a method for fabricating a semicrystalline polymer/graphene oxide composite film, comprising: providing a polymer/graphene oxide casting solution by dissolving a polymer in a first solvent to obtain a mixture solution, adding a graphene oxide solution into the mixture solution, and stirring until uniform wherein the graphene oxide solution comprises a second solvent and graphene oxide dispersed in the second solvent; performing a film forming procedure by coating the polymer/graphene oxide casting solution on a substrate to form a first film on the substrate wherein the graphene oxide in the first film has a layered structure and distributed in the polymer; performing a crystallization procedure by drying the first film with heat to form the first film having a first semicrystalline-typed polymer wherein the first semicrystalline-typed polymer has a porous structure and the first semicrystalline-typed polymer and graphene oxide are distributed uniformly in the first film with respect to each other so as to have the first semicrystalline-typed polymer exist between graphene oxide and graphene oxide also exist between the first semicrystalline-typed polymers; performing a recrystallization procedure by having the composite film having the first semicrystalline-typed polymer undergo heat treatment to induce the first semicrystalline-typed polymer polyvinyl alcohol between adjacent layers of graphene oxide to form a second semicrystalline-typed polymer so as to obtain a composite film having the first semicrystalline-typed polymer and the second semicrystalline-typed polymer wherein the second semicrystalline-typed polymer fills and seals the porous structure of the first semicrystalline-typed polymer to block gas from flowing through and to increase a length that gas passes from one side of the composite film to the other side of the composite film.

According to the method of the present invention, the graphene oxide solution is prepared by dissolving sodium nitrate in concentrated sulfuric acid by heating and stirring to obtain a sodium nitrate/sulfuric acid solution; adding graphene oxide into the sodium nitrate/sulfuric acid solution and stirring until uniform to obtain a first mixture; lowering the temperature of the first mixture by placing in an ice bath; slowly adding potassium permanganate ($KMnO_4$) after the first mixture is stabilized; slowly adding deionized water; setting the solution to obtain graphene oxide precipitation; performing vacuum drying to obtain graphene oxide flakes; and dispersing graphene oxide in deionized water by supersonic oscillation to ensure graphene oxide completely being dispersed in deionized water and being exfoliated with a single layered structure so as to obtain the graphene oxide solution.

The first solvent is deionized water. The mixture solution is a polyvinyl alcohol solution and comprises polyvinyl alcohol and deionized water with a weight ratio (polyvinyl alcohol/deionized water) of 1:100~20:100. Preferably, the mixture solution is a polyvinyl alcohol solution and comprises polyvinyl alcohol and deionized water with a weight ratio (polyvinyl alcohol/deionized water) of 5:95. The second solvent is deionized water. The graphene oxide solution comprises graphene oxide and deionized water with a weight ratio (graphene oxide/deionized water) of 1:50000~1:1000. Preferably, the graphene oxide solution comprises graphene oxide and deionized water with a weight ratio (graphene oxide/deionized water) of 1:10000.

According to the method of the present invention, the polymer is polyvinyl alcohol and the step of performing a crystallization procedure by drying the first film with heat comprises: drying the first film at 80~100° C. for 1~3 hr; and processing the first film by vacuum drying for 18~24 hr at room temperature to have polyvinyl alcohol form into a first semicrystalline-typed polyvinyl alcohol. The heat treatment in the recrystallization procedure is controlled within a temperature range of 80~140° C. . After the recrystallization procedure, the method further comprises: performing a quenching procedure by placing the composite film in a temperature range of 3~15° C. . The polymer is polyvinyl alcohol and the semicrystalline polymer/graphene oxide composite film is semicrystalline polyvinyl alcohol/graphene oxide composite film having a film thickness of 5~100 μm. Preferably, the semicrystalline polymer/graphene oxide composite film is semicrystalline polyvinyl alcohol/graphene oxide composite film having a film thickness of 10 μm. The step of performing a film forming procedure by coating the polymer/graphene oxide casting solution on a substrate is performed by using a doctor blade to form a wet film with a thickness of 100~1000 μm. The step of performing a film forming procedure by coating the polymer/graphene oxide casting solution on a substrate is performed by using a doctor blade to form a wet first film with a thickness of 300 μm. The polymer is polyvinyl alcohol, the semicrystalline polymer/graphene oxide composite film is semicrystalline polyvinyl alcohol/graphene oxide composite film and a weight ratio of the semicrystalline polyvinyl alcohol to graphene oxide of the composite film is 1000:1~50:1. Preferably, the weight ratio of the semicrystalline polyvinyl alcohol to graphene oxide of the composite film is 1000:1.

DESCRIPTION OF THE PREFERRED EMBODIMENTS

What is probed into the invention is a semicrystalline polymer/graphene oxide composite film. Detail descriptions of the structure and elements will be provided in the following in order to make the invention thoroughly understood. Obviously, the application of the invention is not confined to specific details familiar to those who are skilled in the art. On the other hand, the common structures, elements, and processes that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

In one embodiment of the present invention, a semicrystalline polymer/graphene oxide composite film is provided. The composite film is formed by a polymer and graphene oxide. Since graphene oxide has a layered structure, graphene oxide can be blended with a semicrystalline polymer and the layered graphene oxide can induce the semicrystalline polymer for further recrystallization by heat treatment. Because layered graphene oxide exists or distributes among the skeleton (structural space) of the semicrystalline polymer, new semicrystalline-typed polymer is formed between the layered structure of graphene oxide so as to generate a composite film containing semicrystalline polymer and graphene oxide with a specific structure. The polymer is selected from the group consisting of the following or combination thereof: polyvinyl alcohol (PVA), ethylene-vinyl alcohol (EVOH) copolymer, polyethylene terephthalate (PET), polypropylene (PP), olyvinylidene chloride, polyetheretherketone (PEEK), and ethylene vinyl acetate copolymer.

Figure 1:
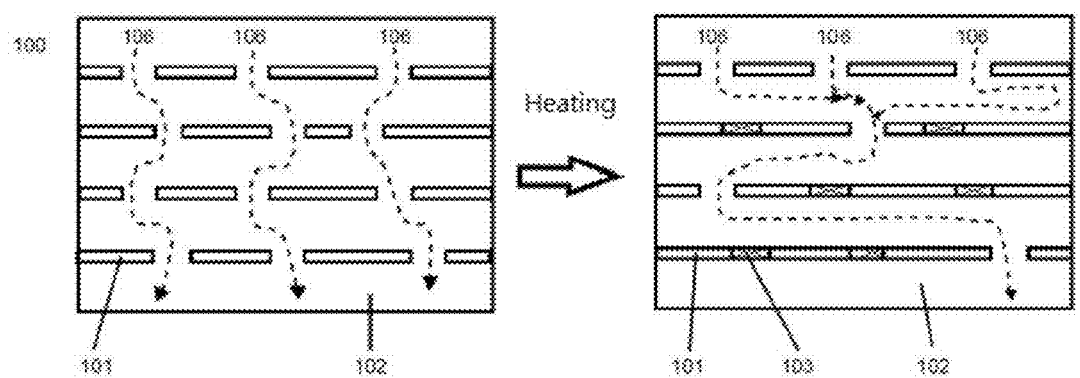
FIG. 1 shows a cross-sectional schematic diagram illustrating a structure of a semicrystalline polymer/graphene oxide composite film according to one embodiment of the present invention.

FIG. 1 shows a cross-sectional schematic diagram illustrating a structure of a semicrystalline polymer/graphene oxide composite film according to one embodiment of the present invention. The semicrystalline polymer/graphene oxide composite film 100 comprises a layered compound 101 (graphene oxide), a first semicrystalline-typed polymer 102 and a second semicrystalline-typed polymer 103. In the semicrystalline polymer/graphene oxide composite film 100, the layered compound 101 (graphene oxide) exists in empty space of the skeleton or structure of the composite film 100 and the first semicrystalline-typed polymer 102 has a porous structure. The polymer is in a crystalline state. The layered compound 101 forms into a plurality of layered structures or has a multiple-layer form and is distributed or dispersed between the first semicrystalline-typed polymers 102. The first semicrystalline-typed polymer 102 between some adjacent layered structures can transform into the second semicrystalline-typed polymer 103 to block gas from flowing through. In this way, the second semicrystalline-typed polymer 103 fills and seals the porous structure and prolongs the length of gas passage 106. That is, gas to pass through the composite film requires going through a longer path.

The method for fabricating the above mentioned semicrystalline polymer/graphene oxide composite film comprises the following steps:

Step 1: preparing a polymeric solution by dissolving a polymer in a solvent to obtain a polymeric casting solution with 5~20 wt % of polymer;

Step 2: having the polymeric casting solution undergo pressurized filtration to remove impurities in the polymeric casting solution;

Step 3: adding a solution dispersed with a layered compound to obtain a polymer/layered compound casting solution 401 with 1~10 wt % of polymer/layered compound;

Step 4: setting the polymer/layered compound casting solution 401 for a day to remove bubbles in the solution for subsequent solution casting;

Step 5: coating the polymer/layered compound casting solution 401 on a flexible plastic substrate by a doctor blade to form a first film with a thickness of 100~300 µm;

Step 6: drying the first film by placing the first film in an 50~120° C. oven for 0.5~3 hr to remove the solvent in the first film;

Step 7: further processing the first film by vacuum drying for 20~30 hr at room temperature to completely remove the solvent in the first film so as to form a composite film having the first semicrystalline-typed polymer 102 with a film thickness of 5~100 µm, preferably 10 µm;

Step 8: placing the composite film in an oven for a predetermined period of time for heat treatment so as to form a composite film 100 having the second semicrystalline-typed polymer 103; and Step 9: quenching the composite film 100 having the second semicrystalline-typed polymer 103 by placing the heat-treated composite film 100 from the oven into a refrigerator at about 3~15° C. to prevent polymeric chains of crystalline zones and non-crystalline zones from being disturbed.

Figure 2:
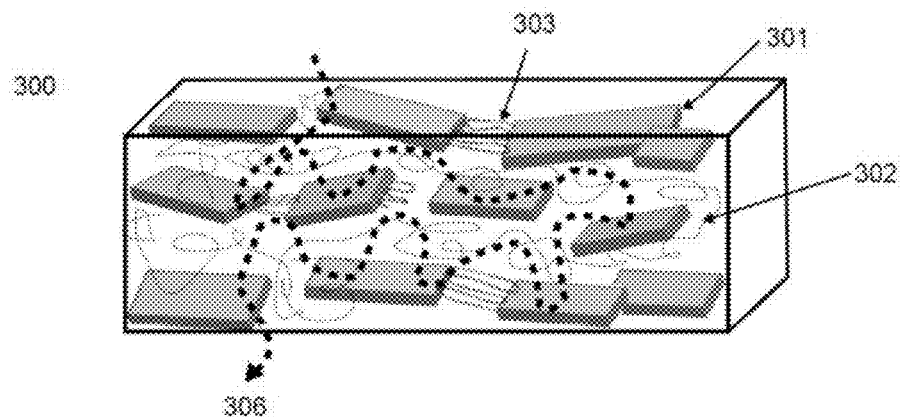
FIG. 2 shows a cross-sectional schematic diagram illustrating a structure of a semicrystalline polyvinyl alcohol/graphene oxide composite film according to one embodiment of the present invention.

In another embodiment of the present invention, a semicrystalline polyvinyl alcohol/graphene oxide composite film 300 is provided. The composite film 300 comprises graphene oxide 301, a first semicrystalline-typed polyvinyl alcohol 302 and a second semicrystalline-typed polyvinyl alcohol 303. In the composite film 300, the first semicrystalline-typed polyvinyl alcohol 302 forms into a porous structure in empty space of the skeleton or structure of the composite film 300. The first semicrystalline-typed polyvinyl alcohol is in a crystalline state. The graphene oxide 301 forms into a plurality of layered structures or has a multiple-layer form and is distributed or dispersed between the first semicrystalline-typed polyvinyl alcohol 302. The first semicrystalline-typed polyvinyl alcohol 302 between some adjacent layered structures can transform into the second semicrystalline-typed polyvinyl alcohol 303 to block gas from flowing through. In this way, the second semicrystalline-typed polyvinyl alcohol 303 fills and seals the porous structure and prolongs the length of gas passage 306. That is, gas to pass through the composite film requires going through a longer path. As shown in FIG. 2, the method for fabricating the above mentioned semicrystalline polymer/graphene oxide composite film 300 comprises the following steps:

Step 1: adding sodium nitrate and concentrated sulfuric acid in a beaker and heating to 80° C. and stirring until sodium nitrate is completely dissolved in sulfuric acid;

Step 2: adding graphene oxide into sodium nitrate/sulfuric acid solution and stirring for 2 hr until uniform;

Step 3: placing in an ice bath for 20 min to lower the temperature;

Step 4: slowly adding potassium permanganate ($KMnO_4$) after the mixture solution is stabilized;

Step 5: slowly adding deionized water after 2 hr of reaction and staying in the ice bath because a large amount of heat will be generated;

Step 6: slowly adding hydrogen peroxide to reduce manganese ion;

Step 7: adding deionized water and setting the solution to a standstill for a day to obtain precipitation (graphene oxide);

Step 8: rinsing precipitation (graphene oxide) by HCl and deionized water repeatedly; and Step 9: using a dialysis bag to wash graphene oxide until pH=7.0.

In this embodiment, after step 9, the following steps are proceeded:

Step 10: performing vacuum drying to obtain graphene oxide flakes;

Step 11: dispersing graphene oxide in water by supersonic oscillation for more than 1 hr to ensure graphene oxide completely being dispersed in water and being exfoliated with a single layered structure Step 12: preparing a polyvinyl alcohol casting solution by dissolving polyvinyl alcohol in deionized water, stirring in an oil bath for 1 hr, and then stirring under room temperature for 30 min so as to obtain a 10 wt % polyvinyl alcohol casting solution;

Step 13: having the polyvinyl alcohol casting solution undergo pressurized filtration to remove impurities in the polyvinyl alcohol casting solution;

Step 14: adding the solution having different concentration of graphene oxide and stirring until uniform so as to obtain a polyvinyl alcohol/graphene oxide casting solution 401 with 5 wt % of polyvinyl alcohol/graphene oxide; and Step 15: setting the polyvinyl alcohol/graphene oxide casting solution 401 for a day to remove bubbles in the solution for subsequent solution casting.

Figure 3:
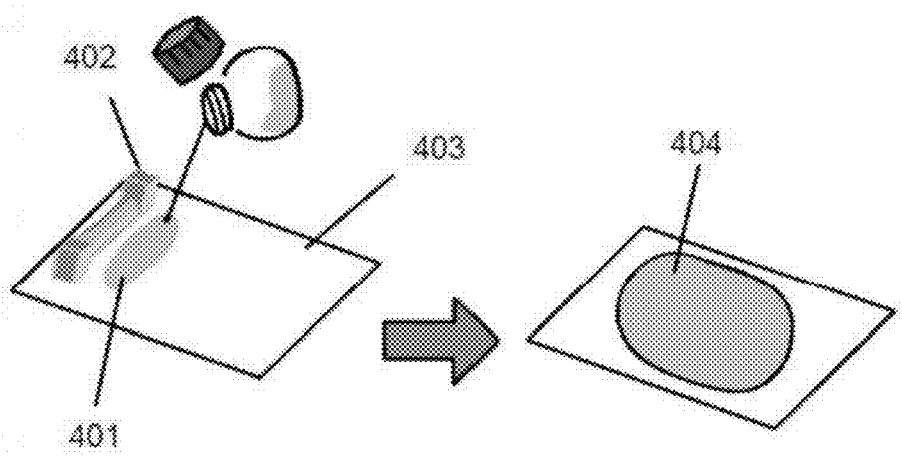
FIG. 3 shows a schematic diagram illustrating forming a semicrystalline polymer/graphene oxide composite film by a doctor blade according to one embodiment of the present invention.

In this embodiment, after step 15, the following steps are proceeded:

Step 16: coating the casting solution 401 on a PET flexible plastic substrate 403 by a doctor blade, as shown in FIG. 3, to form a first film 404 with a thickness of 300 μm;

Step 17: drying the first film by placing the first film 404 in an 90° C. oven for 1 hr to remove the solvent in the first film 404;

Step 18: further processing the first film by vacuum drying for 24 hr at room temperature to completely remove the solvent in the first film 404 so as to form a composite film having the first semicrystalline-typed polyvinyl alcohol with a film thickness of 5~100 μm, preferably 10 μm;

Step 19: placing the composite film in an oven for a predetermined period of time for heat treatment so as to form a composite film 300 having the second semicrystalline-typed polyvinyl alcohol; and Step 20: quenching the composite film 300 having the second semicrystalline-typed polyvinyl alcohol by placing the heat-treated composite film 300 from the oven into a refrigerator at about 3~15° C., preferably 5° C., to prevent polymeric chains of crystalline zones and non-crystalline zones from being disturbed.

According to one embodiment of the present invention, a semicrystalline polyvinyl alcohol/graphene oxide composite film formed by polyvinyl alcohol and graphene oxide is provided. Since the crystallinity (Xc) affects gas permeability, the crystallinity of the composite film formed by adding the different quantity of graphene oxide into polyvinyl alcohol is tested. From table 1 shown below, it is found that adding the different quantity of graphene oxide into polyvinyl alcohol does not significantly affect the crystallinity of the composite film, that is, the addition amount of graphene oxide in the range of the present invention does not significantly affect crystallization behavior of polyvinyl alcohol. Therefore, the effect of the crystallinity to gas permeability under the addition amount of graphene oxide in the range of the present invention can be ignored.

Go Concentration

TABLE 1

DSC result for PVA/GO composite films with different GO concentration

| GO Concentation (wt %) | Crystallinity (%) |
|---|---|
| 0 | 32.4 |
| 0.1 | 32.46 |
| 0.25 | 32.02 |
| 0.5 | 31.91 |
| 1 | 31.77 |

Figure 4A:
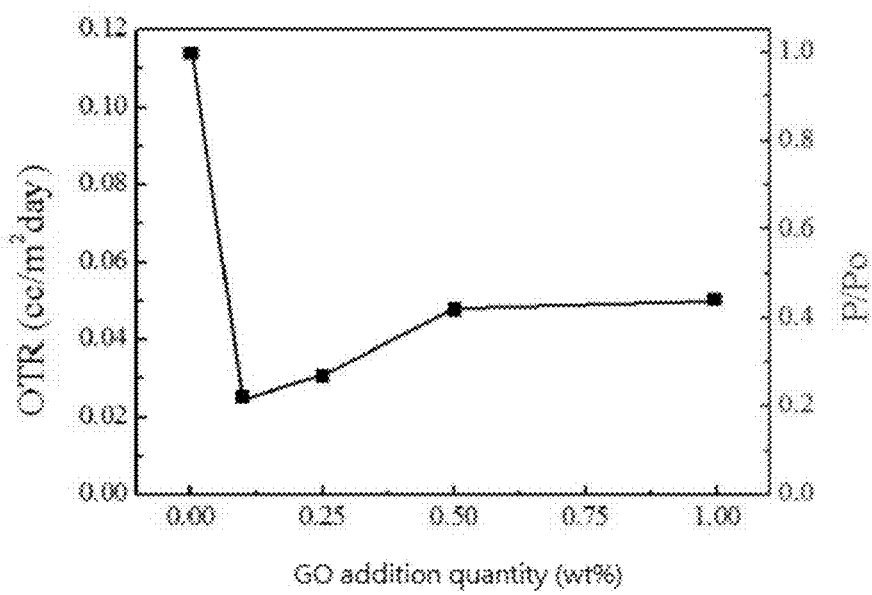
FIG. 4A shows a schematic diagram illustrating the relationship between the addition quantity of graphene oxide and oxygen transmission rate (OTR) in the semicrystalline polymer/graphene oxide composite film according to one embodiment of the present invention.

According to another embodiment of the present invention, a semicrystalline polyvinyl alcohol/graphene oxide composite film by adding graphene oxide into polyvinyl alcohol is provided. FIG. 4A shows a schematic diagram illustrating the relationship between the addition quantity of graphene oxide and oxygen transmission rate (OTR) in the semicrystalline polymer/graphene oxide composite film according to one embodiment of the present invention. From the figure, it is found that OTR decreases and then slowly increases when the addition quantity increases. When the addition quantity of graphene oxide is 0.1 wt %, the lowest OTR (0.025 cc/$m^2$ day) is obtained. When the addition quantity of graphene oxide is 0.1 wt %, OTR of the polyvinyl alcohol/graphene oxide film is lower about 80%, compared with the polyvinyl alcohol/PET film. The DSC results (data) show that the crystallinity of polyvinyl alcohol is not affected significantly by adding or doping graphene oxide. Therefore, it is confirmed that graphene oxide in polyvinyl alcohol possesses its gas barrier characteristic.

Figure 5:
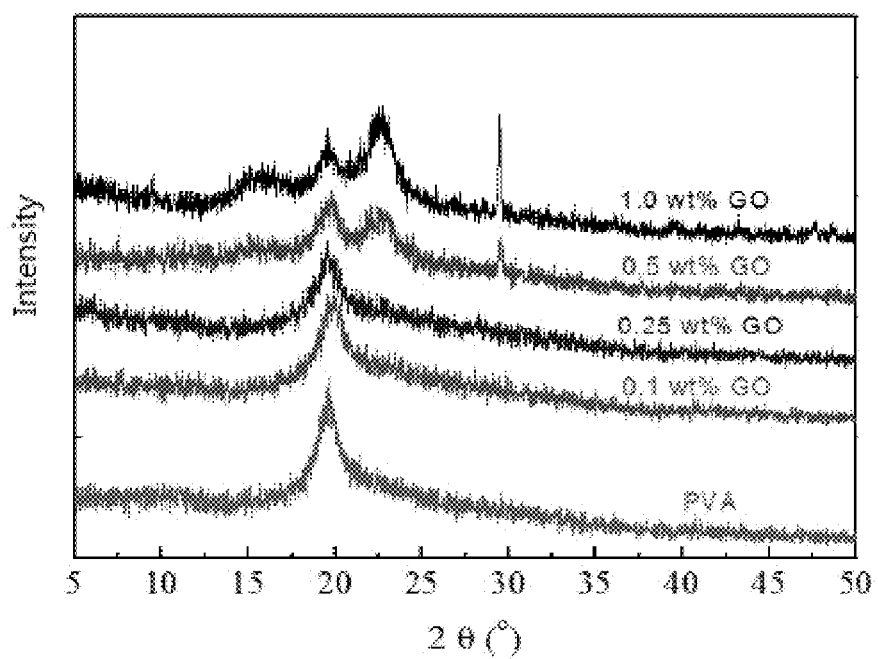
FIG. 5 shows a schematic diagram illustrating X-ray diffraction spectra of the semicrystalline polymer/graphene oxide composite film according to one embodiment of the present invention.

Please refer to FIG. 5. FIG. 5 shows a schematic diagram illustrating X-ray diffraction spectra of the semicrystalline polymer/graphene oxide composite film according to one embodiment of the present invention. An X-ray diffraction analyzer and a field-emission scanning electron microscope are used to analyze cases that graphene oxide is dispersed (scattered) in polyvinyl alcohol. Since there is no graphene oxide characteristic peak at about 10°, it means that graphene oxide is scattered or dispersed in polyvinyl alcohol to be exfoliated or intercalated for the addition quantity of graphene oxide (<1 wt %). Therefore, no graphene oxide characteristic peak indicates that graphene oxide has high gas barrier characteristic within this range, as shown in FIG. 4A.

Figure 6:
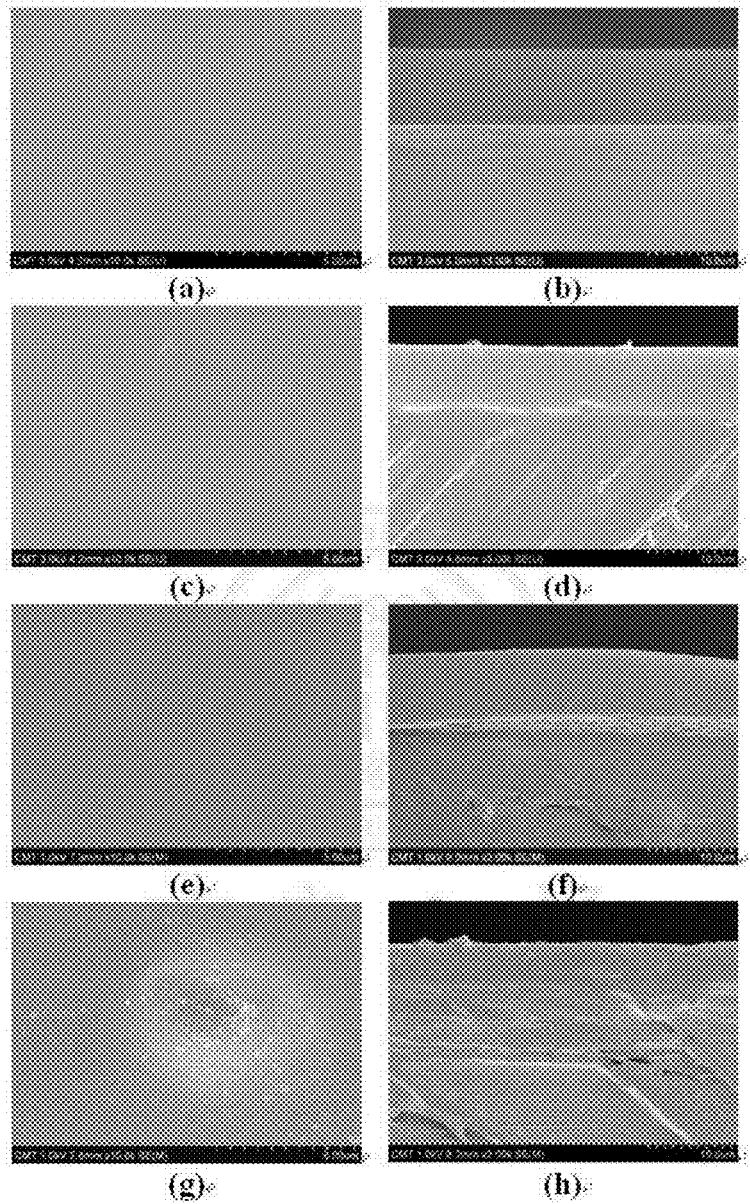
FIG. 6 shows a schematic diagram illustrating surfaces and cross sections of polyvinyl alcohol/polyethylene terephthalate film and polyvinyl alcohol/graphene oxide composite film viewed by SEM according to one embodiment of the present invention.

FIG. 6 shows a schematic diagram illustrating surfaces and cross sections of polyvinyl alcohol/polyethylene terephthalate film and semicrystalline polyvinyl alcohol/graphene oxide composite film viewed by SEM according to one embodiment of the present invention where (a), (c), (e), and (g) show surfaces containing 0.1 wt %, 0.25 wt %, 0.5 wt %, and 1.0 wt %, respectively; and (b), (d), (f), and (h) show cross sections containing 0.1 wt %, 0.25 wt %, 0.5 wt %, and 1.0 wt %, respectively. From the figure, the surface having graphene oxide aggregates for 1.0 wt % graphene oxide causes the gas barrier characteristic to be lowered, as shown in FIG. 4A. In addition, from the cross sections, it is found that polyvinyl alcohol and the semicrystalline polyvinyl alcohol/graphene oxide composite film both form a dense thin film on the polyethylene terephthalate substrate, with a thickness about 10 μm. It shows that gas barrier performance is not closely related to the thickness of polyvinyl alcohol.

Figure 4B:
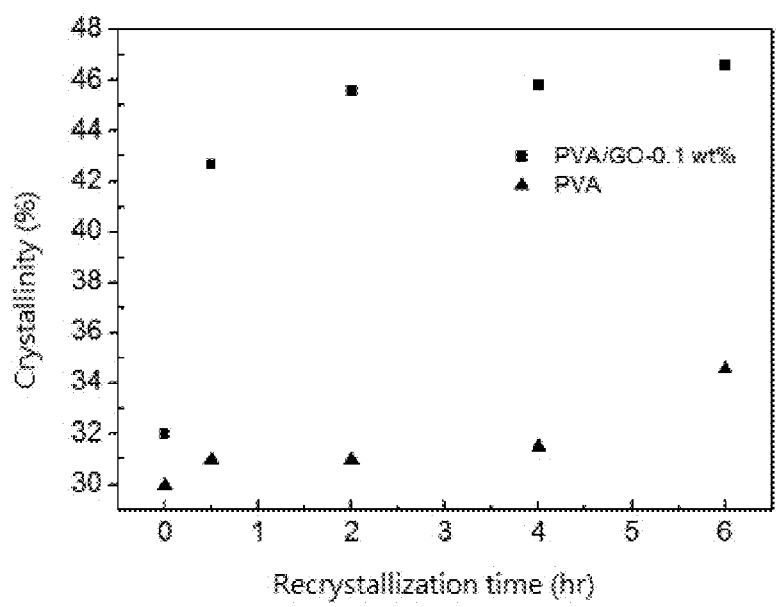
FIG. 4B shows a schematic diagram illustrating the relationship between crystallinity and recrystallization time at 100° C. for pure PVA and PVA added with 0.1 wt % graphene oxide in the semicrystalline polymer/graphene oxide composite film according to one embodiment of the present invention.
Figure 7:
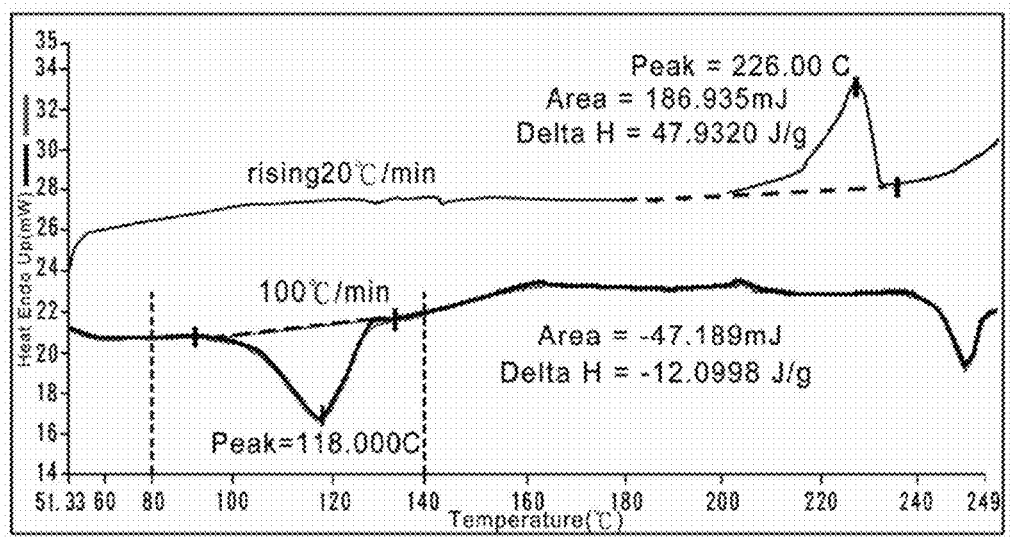
FIG. 7 shows a schematic diagram illustrating DSC (differential scanning calorimeter) results of polyvinyl alcohol according to one embodiment of the present invention.

According to another embodiment of the present invention, the effect of constant temperature recrystallization to the gas barrier characteristic of the semicrystalline polyvinyl alcohol/graphene oxide composite film is discovered. The differential scanning calorimeter (DSC) spectra of polyvinyl alcohol is shown in FIG. 7. The crystallization temperature range of the semicrystalline polyvinyl alcohol is about 80~140° C. Thus, in this embodiment, the heat treatment for constant temperature recrystallization to the composite film is performed within the above temperature range so as to form the second semicrystalline-typed polyvinyl alcohol in the composite film for enhancing gas barrier performance. Under oxygen transmission rate tests, after graphene oxide is added, compared to the composite without the second semicrystalline-typed polyvinyl alcohol but only with the first semicrystalline-typed polyvinyl alcohol, the composite film with the second semicrystalline-typed polyvinyl alcohol has lower oxygen transmission rate. Therefore, the optimum addition quantity of graphene oxide is 0.1 wt %, as shown in FIG. 4A. Therefore, at 80~140° C., preferably 100° C., the composite film is processed with heated treatment for constant temperature recrystallization for different duration and tested with oxygen transmission rate. From FIG. 4B, it is found that the composite film processed for 1~6 hr, preferably 6 hr of recrystallization can become a semicrystalline polyvinyl alcohol/graphene oxide composite film having a second semicrystalline-typed polyvinyl alcohol having crystallinity increased to 46.56% from 32.46%. As shown in FIG. 4B, it is found that crystallinity is increased by 100° C. of recrystallization processing and 0.1 wt % graphene oxide addition. Therefore, it shows that graphene oxide functions as a nucleating agent to induce formation of the second semicrystalline-typed polyvinyl alcohol and the newly formed semicrystalline-typed polyvinyl alcohol surrounds graphene oxide in the composite film.

Figure 8:
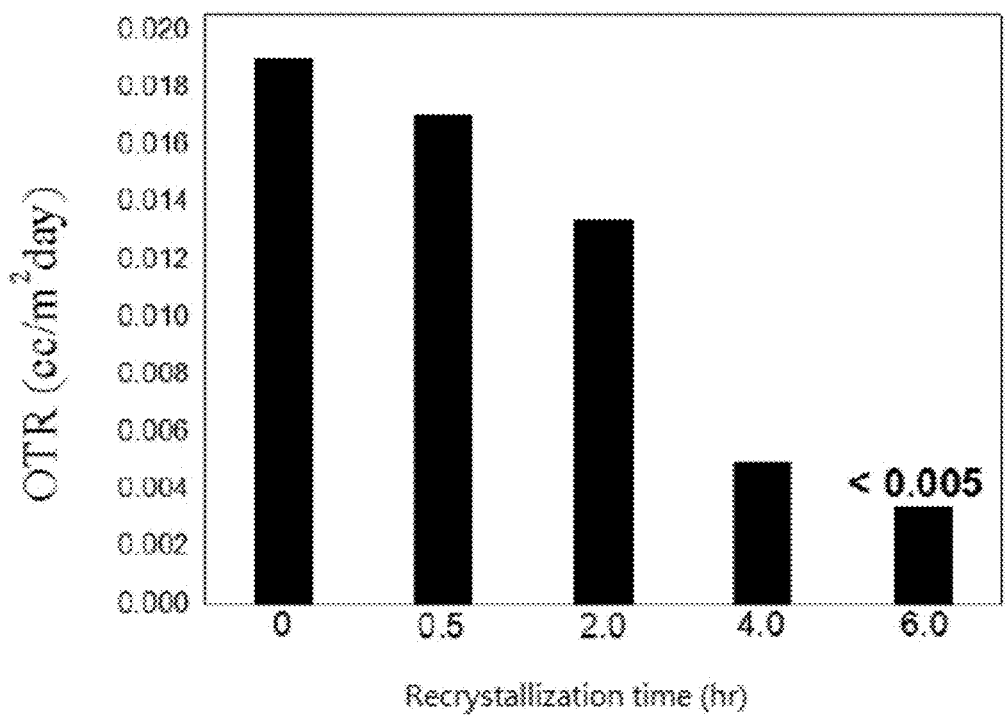
FIG. 8 shows a schematic diagram illustrating the relationship between heat treatment time and OTR of the semicrystalline polymer/graphene oxide composite film.

According to this embodiment, in the oxygen transmission rate test shown in FIG. 8, the semicrystalline polyvinyl alcohol/graphene oxide composite film after heat treatment has significantly lower OTR than before heat treatment. It shows that the second semicrystalline-typed polyvinyl alcohol can effectively increase the length of the gas passage path so as to decrease the gas transmission rate to achieve the requirement of gas barrier. When the recrystallization duration increases, crystallinity is increased to effectively reduce OTR.

Figure 9:
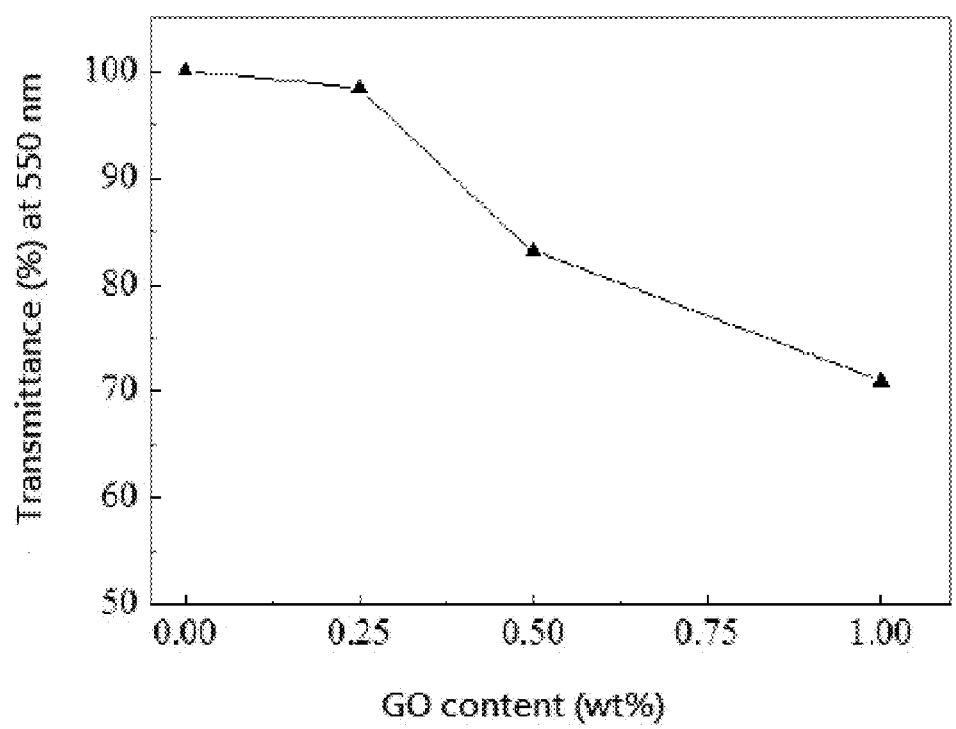
FIG. 9 shows a schematic diagram illustrating the relationship between the addition quantity of graphene oxide and transmittance according to one embodiment of the present invention.

According to the embodiments of the present invention, the relationship between the addition quantity of graphene oxide and transmittance for the semicrystalline polyvinyl alcohol/graphene oxide composite film is shown in FIG. 9. The composite films with different quantities of graphene oxide have different transmittance. Although PVA is transparent, the transmittance gradually decreases when the addition quantity of graphene oxide increases. Generally, the transmittance of 85% is a limit for a flexible display and thus transmittance for a composite film having graphene oxide less than 0.25 wt % has no significant difference with pure PVA while transmittance for a composite film having graphene oxide more than 0.25 wt % becomes seriously lower. Therefore, when the addition quantity of graphene oxide is less than 0.25 wt %, the composite film is applicable to applications related to flexible displays.

According to the embodiments of the present invention, graphene oxide having a single-layered structure uniformly dispersed in PVA can be fabricated so as to obtain the composite film. Under the condition of the addition quantity of graphene oxide being 0.1 wt %, the oxygen transmission rate of the composite film has a 80% decrease compared to a pure PVA film and the oxygen transmission rate of the composite film being further processed by constant temperature crystallization to comprise the second semicrystalline-typed polyvinyl alcohol has a more than 94% decrease compared to a pure PVA film.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A method for fabricating a semicrystalline polymer / graphene oxide composite film, comprising:
   providing a polymer/graphene oxide casting solution by dissolving a polymer in a first solvent to obtain a mixture solution, adding a graphene oxide solution into the mixture solution, and stirring until uniform wherein the graphene oxide solution comprises a second solvent and graphene oxide dispersed in the second solvent, wherein the polymer is polyvinyl alcohol;
   performing a film forming procedure by coating the polymer/graphene oxide casting solution on a substrate to form a first film on the substrate wherein the graphene oxide in the first film has a layered structure and distributed in the polymer;
   performing a crystallization procedure by drying the first film with heat to form the first film having a first semicrystalline polymer wherein the first semicrystalline polymer has a porous structure and the first semicrystalline polymer and graphene oxide are distributed uniformly in the first film with respect to each other so as to have the first semicrystalline polymer exist between graphene oxide and graphene oxide also exist between the first semicrystalline polymers; and performing a recrystallization procedure by having the composite film having the first semicrystalline polymer undergo heat treatment to induce the first semicrystalline polymer comprising polyvinyl alcohol between adjacent layers of graphene oxide to form a second semicrystalline polymer so as to obtain a composite film having the first semicrystalline polymer and the second semicrystalline polymer, wherein the second semicrystalline polymer fills and seals the porous structure of the first semicrystalline polymer to block gas from flowing through and to increase a length that gas passes from one side of the composite film to the other side of the composite film, and said composite film has a weight ratio of the semicrystalline polyvinyl alcohol to graphene oxide of the composite film being 1000:1~50:1, and is characterized by an X-ray powder diffraction pattern comprising peaks at 20.1±0.2, 22.5±0.2 and 29.5±0.2 2-theta degree.

2. The method according to claim 1, wherein the graphene oxide solution is prepared by
dissolving sodium nitrate in concentrated sulfuric acid by heating and stirring to obtain a sodium nitrate/ sulfuric acid solution;
adding graphene oxide into the sodium nitrate/ sulfuric acid solution and stirring until uniform to obtain a first mixture;
lowering the temperature of the first mixture by placing in an ice bath;
adding potassium permanganate ($KMnO_4$) after the first mixture is stabilized;
adding deionized water;
setting the solution to obtain graphene oxide precipitation;
performing vacuum drying to obtain graphene oxide flakes; and
dispersing graphene oxide in deionized water by supersonic oscillation to ensure graphene oxide completely being dispersed in deionized water and being exfoliated with a single layered structure so as to obtain the graphene oxide solution.

3. The method according to claim 1, wherein the first solvent is deionized water.

4. The method according to claim 1, wherein the mixture solution is a polyvinyl alcohol solution and comprises polyvinyl alcohol and deionized water with a weight ratio (polyvinyl alcohol/ deionized water) of 1:100~20:100.

5. The method according to claim 4, wherein the mixture solution is a polyvinyl alcohol solution and comprises polyvinyl alcohol and deionized water with a weight ratio (polyvinyl alcohol/ deionized water) of 5:95.

6. The method according to claim 1, wherein the second solvent is deionized water.

7. The method according to claim 1, wherein the graphene oxide solution comprises graphene oxide and deionized water with a weight ratio (graphene oxide / deionized water) of 1:50000~1:1000.

8. The method according to claim 7, wherein the graphene oxide solution comprises graphene oxide and deionized water with a weight ratio (graphene oxide / deionized water) of 1:10000.

9. The method according to claim 1, wherein the polymer is polyvinyl alcohol and the step of performing a crystallization procedure by drying the first film with heat comprises:
drying the first film at 80~100° C. for 1~3 hr; and
processing the first film by vacuum drying for 18~24 hr at room temperature to have polyvinyl alcohol form into a first semicrystalline-typed polyvinyl alcohol.

10. The method according to claim 1, wherein the heat treatment in the recrystallization procedure is controlled within a temperature range of 80~140° C.

11. The method according to claim 10, wherein the heat treatment in the recrystallization procedure is controlled at 100° C.

12. The method according to claim 1, after the recrystallization procedure, further comprising:
performing a quenching procedure by placing the composite film in a temperature range of 3~15° C.

13. The method according to claim 1, wherein the polymer is polyvinyl alcohol and the semicrystalline polymer / graphene oxide composite film is semicrystalline polyvinyl alcohol / graphene oxide composite film having a film thickness of 5~100 μm.

14. The method according to claim 13, wherein the semicrystalline polymer / graphene oxide composite film is semicrystalline polyvinyl alcohol / graphene oxide composite film having a film thickness of 10 μm.

15. The method according to claim 1, wherein the step of performing a film forming procedure by coating the polymer/ graphene oxide casting solution on a substrate is performed by using a doctor blade to form a wet film with a thickness of 100~1000 μm.

16. The method according to claim 1, wherein the step of performing a film forming procedure by coating the polymer/ graphene oxide casting solution on a substrate is performed by using a doctor blade to form a wet first film with a thickness of 300 μm.

17. The method according to claim 1, wherein the weight ratio of the semicrystalline polyvinyl alcohol to graphene oxide of the composite film is 1000:1.

* * * * *